(12) United States Patent
Giustina

(10) Patent No.: US 8,504,125 B2
(45) Date of Patent: Aug. 6, 2013

(54) CONFIGURATION SENSING FOR A MOBILE COMPUTING DEVICE

(75) Inventor: Giancarlo Giustina, San Francisco, CA (US)

(73) Assignee: Palm, Inc., Sunnyvale, CA (US)

( * ) Notice: Subject to any disclaimer, the term of this patent is extended or adjusted under 35 U.S.C. 154(b) by 346 days.

(21) Appl. No.: 12/479,599

(22) Filed: Jun. 5, 2009

(65) Prior Publication Data

US 2010/0304801 A1    Dec. 2, 2010

Related U.S. Application Data

(63) Continuation-in-part of application No. 12/476,094, filed on Jun. 1, 2009.

(51) Int. Cl.
*H04M 1/00*    (2006.01)

(52) U.S. Cl.
USPC ........................... 455/575.1; 455/90.3

(58) Field of Classification Search
USPC ............. 455/550.1, 566, 575.1, 575.3, 575.4, 455/575.8, 90.3
See application file for complete search history.

(56) References Cited

U.S. PATENT DOCUMENTS

| 2004/0198477 | A1* | 10/2004 | Jung et al. | 455/575.4 |
| 2005/0054303 | A1* | 3/2005 | Goltermann et al. | 455/90.3 |
| 2010/0048264 | A1* | 2/2010 | Sato et al. | 455/575.4 |
| 2010/0144405 | A1* | 6/2010 | Hakamata et al. | 455/575.3 |

* cited by examiner

*Primary Examiner* — Ping Hsieh

(57) ABSTRACT

Techniques for configuration sensing for a mobile computing device are described. A mobile computing device may comprise a housing having a sliding structure arranged to allow a first housing portion and a second housing portion to move relative to each other to form a first configuration or a second configuration. The mobile computing device may include a magnetic sensor disposed in the first housing portion, the magnetic sensor operative to measure a magnetic field strength for a magnet, and output a position signal indicative of the first configuration or the second configuration based on the measured magnetic field strength. The mobile computing device may include a speaker with the magnet disposed in the second housing portion. Other embodiments are described and claimed.

18 Claims, 6 Drawing Sheets

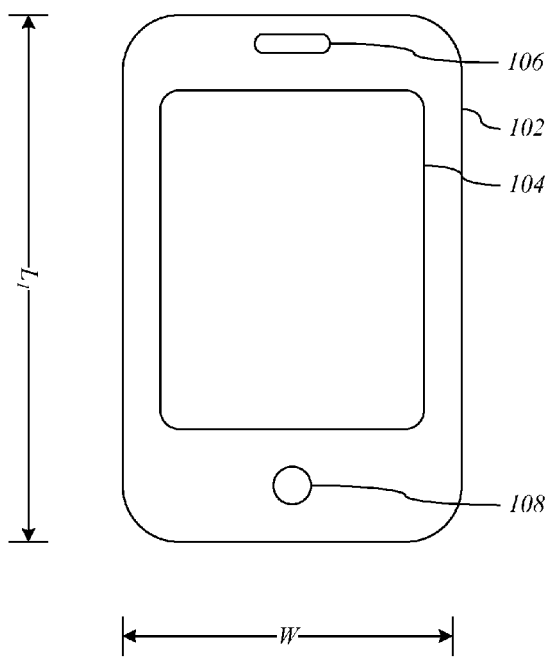
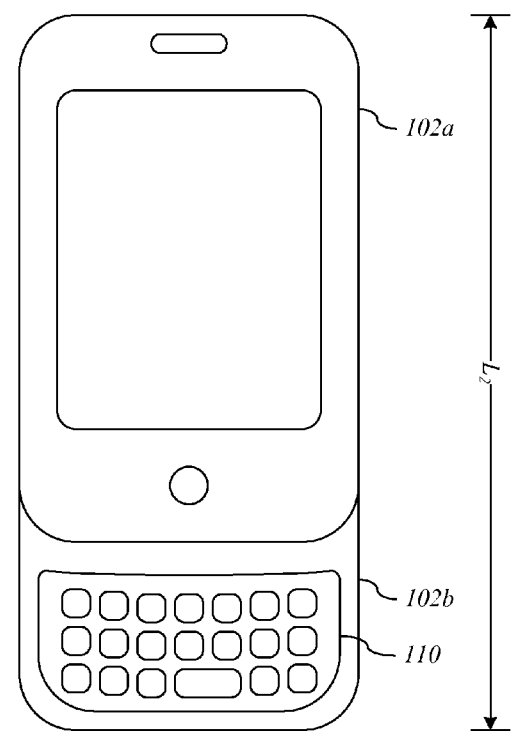
FIG. 1A            FIG. 1B

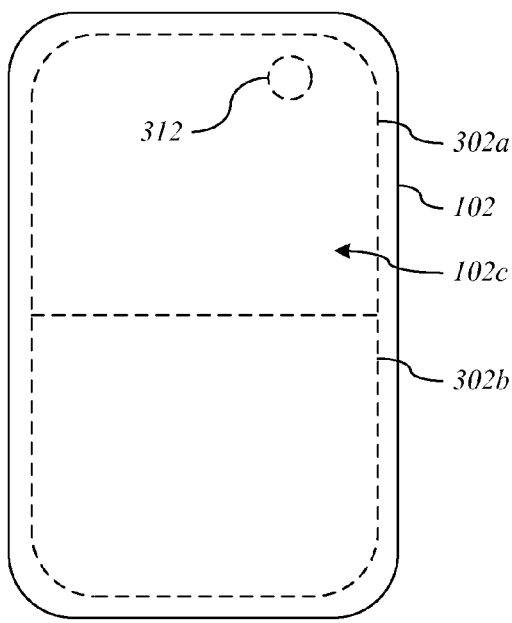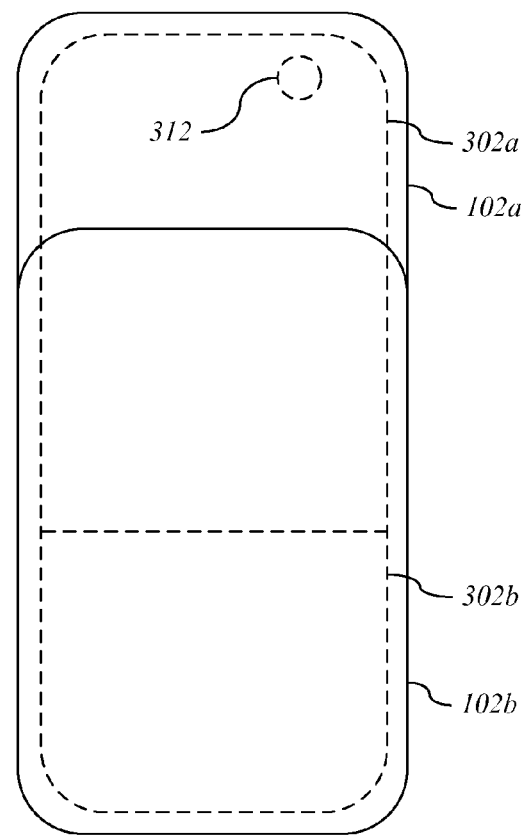
*FIG. 3C*  *FIG. 3D*

500

MEASURE A MAGNETIC FIELD STRENGTH PRODUCED BY A SPEAKER MAGNET
502

GENERATE A FIRST POSITION SIGNAL WHEN THE MEASURED MAGNETIC FIELD STRENGTH IS HIGHER, THE FIRST POSITION SIGNAL REPRESENTING A FIRST CONFIGURATION FOR A MOBILE COMPUTING DEVICE
504

GENERATE A SECOND POSITION SIGNAL WHEN THE MEASURED MAGNETIC FIELD STRENGTH IS LOWER, THE SECOND POSITION SIGNAL REPRESENTING A SECOND CONFIGURATION FOR THE MOBILE COMPUTING DEVICE
506

*FIG. 5*

CONFIGURATION SENSING FOR A MOBILE COMPUTING DEVICE

RELATED APPLICATIONS

This application is a continuation-in-part, and claims priority to, the commonly-owned co-pending patent application U.S. Ser. No. 12/476,094, entitled "CONFIGURATION SENSING FOR A MOBILE COMPUTING DEVICE," filed Jun. 1, 2009, which is incorporated herein by reference in its entirety.

BACKGROUND

Mobile computing devices, such as smart phones, have become highly capable communication devices in recent years. In addition to the wide array of processing capabilities such as digital assistant (PDA) features, including word processing, spreadsheets, synchronization of information (e.g., e-mail) with a desktop computer, and so forth, mobile computing devices also typically include wireless communications capabilities to provide features, such as mobile telephony, mobile e-mail access, web browsing, and content (e.g., video and radio) reception. Exemplary wireless communications technologies include cellular, satellite, and mobile data networking technologies.

The increasing number of features for a smart phone poses a design challenge in keeping it small and compact. As such, smaller form factor devices are often designed with multiple mechanical sections that fold or slide into different positions or configurations. If the device is in a "closed" position, for example, then it is smaller and more compact, allowing easy portability. In a partially open configuration, the mechanical section may reveal a keyboard or touch panel that allows easy user input. In a fully open configuration, the device may present a full display screen, touch pad, keyboard or other functionality for ease of use. For such devices, it is desirable to detect the position or configuration of the mechanical sections in an efficient manner.

BRIEF DESCRIPTION OF THE DRAWINGS

FIG. 1A illustrates a first front perspective for a mobile computing device.

FIG. 1B illustrates a second front perspective for a mobile computing device.

FIG. 3C illustrates a third back perspective for a mobile computing device.

FIG. 3D illustrates a fourth back perspective for a mobile computing device.

FIG. 5 illustrates one embodiment for a logic diagram.

DETAILED DESCRIPTION

Figure 2A:
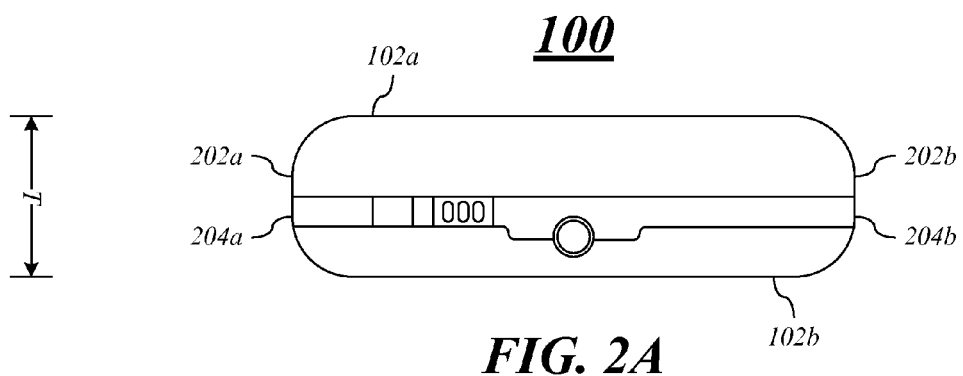
FIG. 2A illustrates a first side perspective for a mobile computing device.

Embodiments are generally directed to techniques for sensing a mechanical configuration for a mobile computing device, such as a smart phone. Some embodiments are particularly directed to a mobile computing device with multiple sections that can be placed in different mechanical configurations. One section may have a component with a magnet, such as an acoustic speaker, while another section may have a magnetic sensor. The magnetic sensor may detect and measure a magnetic field strength for the magnet based on proximity, and output a position signal indicating a particular configuration for the smart phone. Feature sets for the mobile computing device may be enabled or disabled based on the detected configuration. Using a magnet for another component of the smart phone to determine its mechanical configuration reduces costs, board space, internal volume, power consumption and overall physical size of the device.

FIGS. 1A, 1B illustrate a front perspective for a mobile computing device 100. The mobile computing device 100 may comprise, or be implemented as, any type of suitable portable wireless device that is consistent with the described embodiments, such as a smart phone, mobile station, portable computing device with a self-contained power source (e.g., battery), a laptop computer, ultra-laptop computer, personal digital assistant (PDA), cellular telephone, combination cellular telephone/PDA, mobile unit, subscriber station, user terminal, portable computer, handheld computer, palmtop computer, wearable computer, media player, pager, messaging device, data communications device, and so forth.

In one embodiment, for example, the mobile computing device 100 may be implemented as a combination handheld computer and mobile telephone, sometimes referred to as a smart phone. Examples of smart phones include various Palm® products such as Palm® Pre™ and Treo™ smart phones, made by Palm Inc., Sunnyvale, Calif. Although some embodiments may be described with the mobile computing device 100 implemented as a smart phone by way of example, it may be appreciated that the embodiments are not limited in this context.

The mobile computing device 100 has multiple sections that can be placed in different mechanical configurations. The sections are connected and arranged for physical and mechanical movement of one or more sections to form different shapes and geometries for the mobile computing device 100. For instance, when implemented as a Palm Pre, the mobile computing device 100 may have a slider mechanism or hinge that allows two sections to move away from another to lengthen the mobile computing device 100. Other mechanical configurations are possible as well.

FIGS. 1A, 1B illustrate various front perspectives for the mobile computing device 100. As shown in FIGS. 1A, 1B, the mobile computing device 100 comprises various hardware features, such as a housing 102, a display 104, a speaker 106, an input button 108, and a thumbboard 110. It may be appreciated that other hardware elements and positions are possible as well.

In one or more embodiments, the housing 102 may comprise multiple mechanical sections or parts, including a first housing portion 102a, a second housing portion 102b, and a configuration portion 102c. The configuration portion 102c is typically a structure internal to the housing 102 and is therefore not shown in FIGS. 1A, 1B. The housing 102 may comprise other mechanical sections or parts as well.

The configuration portion 102c may be arranged to allow the first housing portion 102a and the second housing portion 102b to move relative to each other to form multiple mechanical configurations, including a first configuration and a second configuration. In various embodiments, the configuration portion 102c may comprise a sliding structure, a pivot structure or a folding structure. A sliding structure allows the housing portions 102a, 102b to slide towards each other or away from each other. The sliding structure may comprise, for example, a sliding hinge or rails. A pivot structure allows the housing portions 102a, 102b to pivot around a pivot point, thereby rotating the housing portions 102a, 102b so that a longitudinal center axis for each of the housing portions 102a, 102b are aligned or misaligned. A folding structure allows the housing portions 102a, 102b to fold towards each other or away from each other, and is sometimes referred to as a "clamshell" design. Some embodiments are described with the configuration portion 102c implemented as a sliding structure by way of example and not limitation. However, the embodiments are not limited in this context.

FIG. 1A illustrates the mobile computing device 100 when in a first configuration, referred to herein as a closed configuration. A closed configuration provides a smaller form factor for the mobile computing device 100. For instance, the mobile computing device 100 may have dimensions of a first length ($L_1$) of approximately 100.53 mm, and a width (W) of approximately 59.57 mm (widest in the middle). Other dimensions are possible as well.

FIG. 1B illustrates the mobile computing device 100 when in a second mechanical configuration, referred to herein as an open configuration. An open configuration provides a larger form factor for the mobile computing device 100. For instance, the mobile computing device 100 may have dimensions of a second length ($L_2$) of approximately 136 mm, while maintaining the same width (W) of approximately 59.57 mm (widest in the middle). Other dimensions may be possible as well.

When the configuration structure 102c is implemented using a sliding structure, the mobile computing device 100 may be re-configured from the closed configuration to the open configuration by sliding the housing portions 102a, 102b away from each other. When in the closed configuration, the mobile computing device 100 only shows the display 104, the speaker 106, and the input button 108. Conversely, the mobile computing device 100 may be re-configured from the open configuration to the closed configuration by sliding the housing portions 102a, 102b towards each other. When in the open configuration, the mobile computing device 100 shows the display 104, the speaker 106, and the input button 108 as in the closed configuration, and further exposes the thumbboard 110.

Figure 2B:
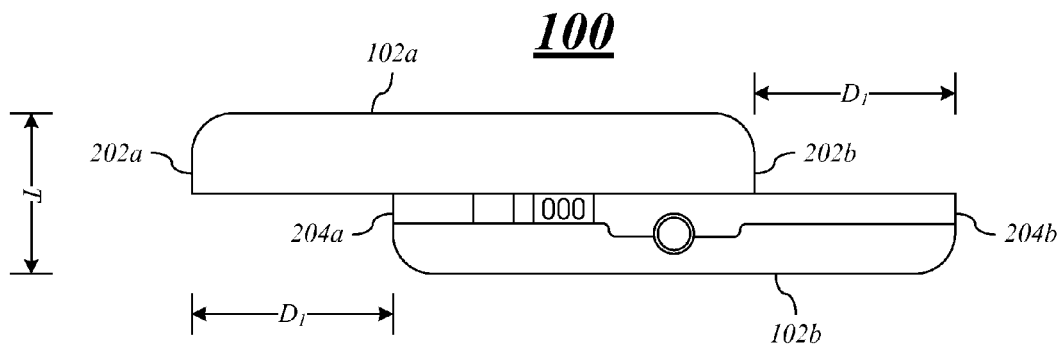
FIG. 2B illustrates a first side perspective for a mobile computing device.

FIGS. 2A, 2B illustrate various side perspectives for the mobile computing device 100. As shown, the housing portions 102a, 102b may have respective top edges 202a, 204a and respective bottom edges 202b, 204b. When in the closed configuration or the open configuration, the mobile computing device 100 may have a thickness (T) of approximately between 11 mm to 16.95 mm (e.g., thickest in the middle when in the open configuration). Other dimensions may be possible as well.

FIG. 2A illustrates the mobile computing device 100 when in a closed configuration. When in a closed configuration, the top edge 202a and the bottom edge 202b of the first housing portion 102a substantially matches the top edge 204a and the bottom edge 204b of the second housing portion 102b. This provides a smaller form factor for the mobile computing device 100.

FIG. 2B illustrates the mobile computing device 100 when in an open configuration. When in an open configuration, the top edge 202a and the bottom edge 202b of the first housing portion 102a are offset a certain distance ($D_1$) from the top edge 204a and the bottom edge 204b of the second housing portion 102b. The distance ($D_1$) may vary according to a given implementation. This provides a larger form factor for the mobile computing device 100.

In various embodiments, a given mechanical configuration may be detected using a magnet and a magnetic sensor located in respective housing portions 102a, 102b. The magnetic sensor may be arranged to measure a magnetic field strength for the magnet, and output a position signal based on the measured magnetic field strength. The measured magnetic field strength represents a distance between a magnet and a magnetic sensor. The position signal may indicate whether the mobile computing device 100 is in a closed configuration or an open configuration. Examples for the magnetic sensor may include without limitation a Hall effect sensor, a Corbino effect sensor, and any other sensors that are sensitive to changes in magnetic fields produced by a magnet or electrical current.

In one embodiment, a magnetic sensor may be implemented as a Hall effect sensor. A Hall effect sensor is a transducer that varies its output voltage in response to changes in a magnetic field. As such, Hall effect sensors may be used for proximity switching, positioning, speed detection, and current sensing applications. In its simplest form, the sensor operates as an analogue transducer, directly returning a voltage. With a known magnetic field, its distance from the Hall plate can be determined. Using one or more sensors, the relative position of a magnet can be deduced.

In one or more embodiments, a magnet for use with a magnetic sensor may comprise part of another component for the mobile computing device 100. The mobile computing device 100 contains an acoustic speaker or receiver to reproduce sounds. Acoustic speakers are used to support a cellular phone, voice recorder, portable music or video player, portable speakers, and other acoustic components. Acoustic speakers typically have a built-in magnet as part of the acoustic system. An existing magnet inside an acoustic speaker generates a magnetic field that can be measured by the Hall effect sensor. In this manner, embodiments avoid the use of a dedicated magnet for a magnetic sensor, thereby reducing associated costs, board space, internal volume, power consumption and overall physical size of the mobile computing device 102.

Figure 3A:
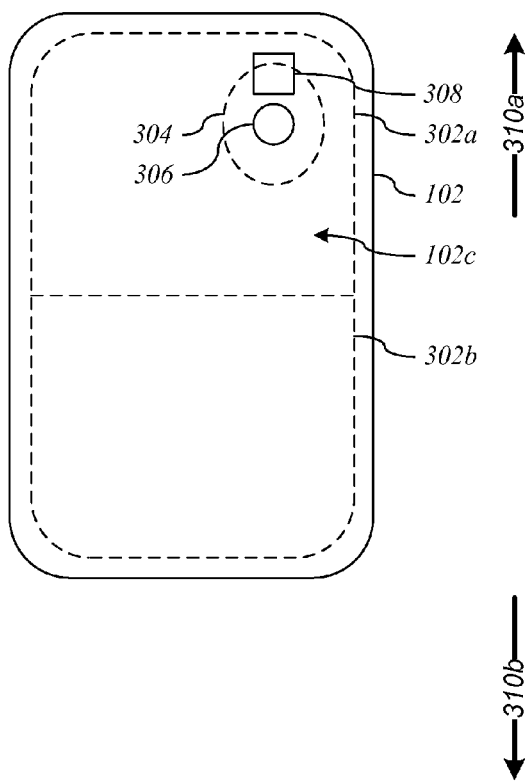
FIG. 3A illustrates a first back perspective for a mobile computing device.
Figure 3B:
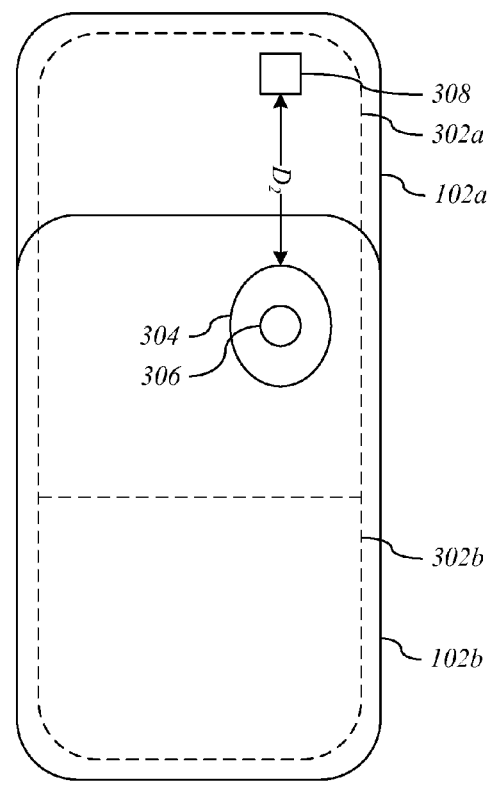
FIG. 3B illustrates a second back perspective for a mobile computing device.

FIGS. 3A, 3B illustrate various back perspectives for the mobile computing device 100. As shown, the mobile computing device 100 may include a magnetic sensor 308. An example for the magnetic sensor 308 may comprise a Hall effect sensor, among others. The magnetic sensor 308 may be disposed within the first housing portion 102a. The mobile computing device 100 may also include a speaker 304 having a magnet 306. The speaker 304 and the magnet 306 may be disposed within the second housing portion 102b.

The magnetic sensor 308 may be arranged to measure a magnetic field strength for the magnet 306 of the speaker 304. The magnetic sensor 308 may output a position signal indicative of the first configuration or the second configuration based on the measured magnetic field strength. The position signal may comprise a voltage level (or current level). For instance, a voltage level may increase as the magnetic sensor 308 moves closer to the magnet 306 thereby decreasing a distance ($D_2$) between the magnetic sensor 308 and the magnet 306. The closed configuration may be indicated at or before a peak voltage level is reached. Conversely, a voltage level may decrease as the magnetic sensor 308 moves away from the magnet 306 there increasing a distance ($D_2$) between the magnetic sensor 308 and the magnet 306. The open configuration may be indicated at or before a minimum voltage level is reached.

FIG. 3A illustrates the mobile computing device 100 when in a closed configuration. As shown, the magnetic sensor 308 may be positioned in the top left hand corner of the first housing portion 102*a*. The speaker 304 and the magnet 306 may be positioned in the top left hand corner of the second housing portion 102*b*. When in the closed configuration, the magnetic sensor 308 is in close proximity to the magnet 306, and therefore the measured magnetic field strength for the magnet 306 reaches a maximum value when the mobile computing device 100 is at length $L_1$. As a result, the magnetic sensor 308 may output a position signal (e.g., high voltage level) indicative of the closed configuration.

FIG. 3B illustrates the mobile computing device 100 when in an open configuration. When in the open configuration, the first housing portion 102*a* and the second housing portion 102*b* may move away from each other thereby extending the mobile computing device 100 from the length $L_1$ to the length $L_2$. For instance, the first housing portion 102*a* may move in direction 310*a*, while the second housing portion 102*b* may move in direction 310*b*.

Since the magnetic sensor 308 is positioned in the top left hand corner of the first housing portion 102*a*, when the first housing portion 102 moves in direction 310*a* the magnetic sensor 308 moves away from the magnet 306. Similarly, when the second housing portion 102*b* moves in direction 310*b* the magnet 306 moves away from the magnetic sensor 308. In both cases, a distance between the magnetic sensor 308 and the magnet 306 increases as the mobile computing device is re-configured from the closed configuration to the open configuration. As the distance increases, the measured magnetic field strength decreases until reaching the length $L_2$, where the measured field strength is at a minimum value. As a result, the magnetic sensor 308 may output a position signal (e.g., a low voltage level) indicative of the open configuration.

FIGS. 3A, 3B also illustrate the configuration portion 102*c* indicated by the dotted lines. The configuration portion 102*c* may comprise, for example, a sliding structure connected to the housing portions 102*a*, 102*b* and allows the housing portions 102*a*, 102*b* to slide towards each other to form the closed configuration and away from each other to form the open configuration.

Although FIGS. 3A, 3B illustrate approximate positioning for the magnetic sensor 308 and the magnet 306, it may be appreciated that the magnetic sensor 308 and the magnet 306 may be positioned anywhere within respective housing portions 102*a*, 102*b* as long as they are arranged in a manner that allows the magnetic sensor 308 to output predefined position signals when in the closed configuration and the open configuration. Furthermore, the magnetic sensor 308 may be disposed on multiple surfaces within the first housing portion 102*a*, including an inner surface of the first housing portion 102*a*, a surface for the configuration portion 102*c*, or a surface for components housed within the first housing portion 102*a*. An example of the latter placement may include positioning on a surface of a printed circuit board (PCB) or other component.

Although FIGS. 3A, 3B illustrate embodiments using a speaker magnet 306, it may be appreciated that other speakers or components housed within the second housing portion 102*b* may have magnets that can also be used with the magnetic sensor 308. The embodiments are not limited in this context.

FIGS. 3C, 3D also illustrate various back perspectives for the mobile computing device 100. FIGS. 3C, 3D also illustrate the configuration portion 102*c* indicated by the dotted lines. The configuration portion 102*c* may comprise, for example, a sliding structure connected to the housing portions 102*a*, 102*b* and allows the housing portions 102*a*, 102*b* to slide towards each other to form the closed configuration and away from each other to form the open configuration. In some embodiments, the configuration portion 102*c* may have an aperture 312 for the magnetic sensor 308. The aperture 312 may allow the magnetic sensor 308 to better detect and measure the magnetic field strength from the magnet 306 (not shown).

Figure 4:
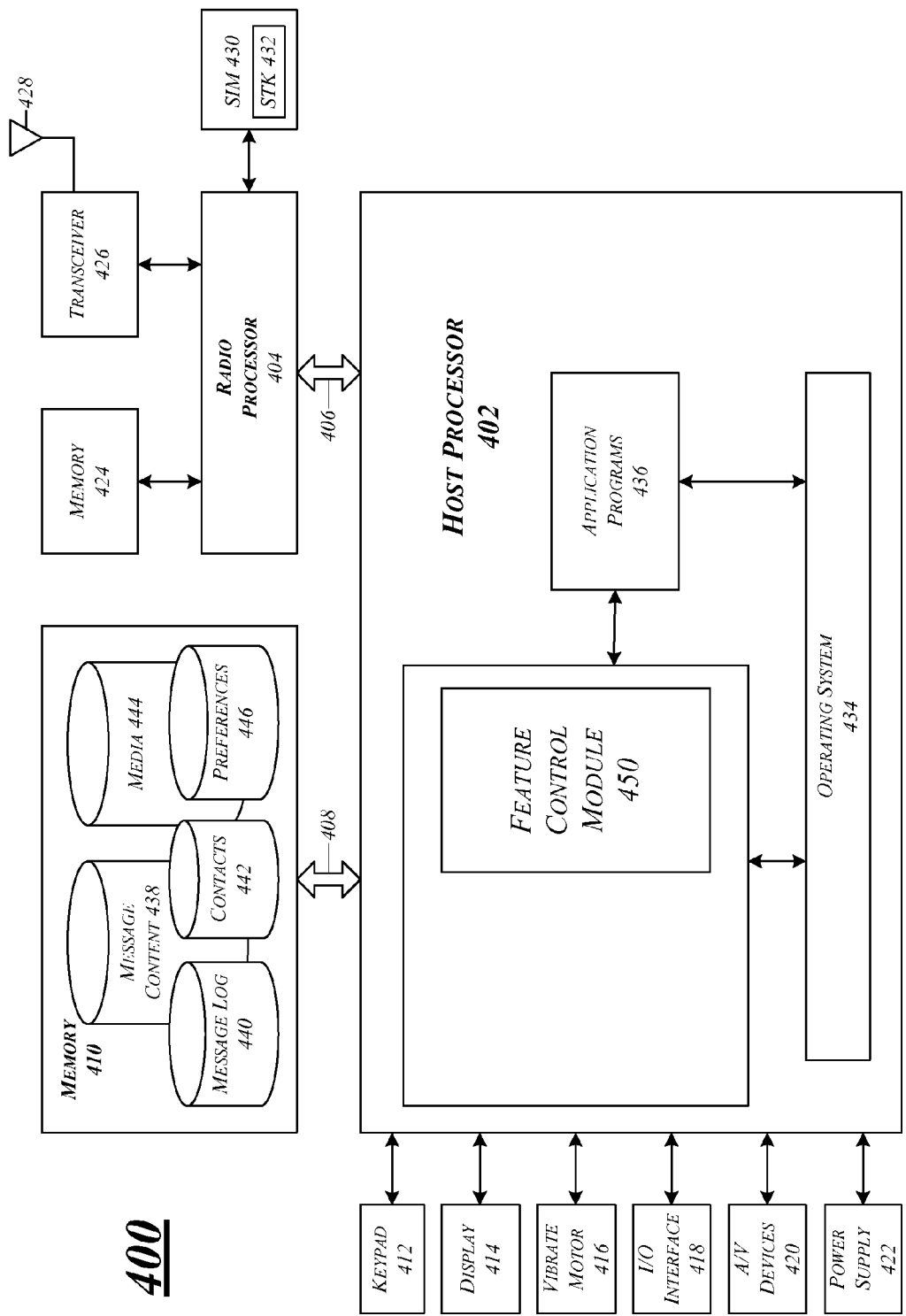
FIG. 4 illustrates one embodiment for a mobile computing device.

FIG. 4 illustrates a block diagram of a second mobile computing device 400 suitable for implementing various embodiments, including the mobile computing device 100. It may be appreciated that the mobile computing device 400 is only one example of a suitable mobile computing environment and is not intended to suggest any limitation as to the scope of use or functionality of the embodiments. Neither should the mobile computing device 400 be interpreted as having any dependency or requirement relating to any one or combination of components illustrated in the exemplary mobile computing device 400.

The host processor 402 (e.g., similar to the processor 110) may be responsible for executing various software programs such as system programs and applications programs to provide computing and processing operations for the mobile computing device 400. The radio processor 404 may be responsible for performing various voice and data communications operations for the mobile computing device 400 such as transmitting and receiving voice and data information over one or more wireless communications channels. Although the mobile computing device 400 is shown with a dual-processor architecture, it may be appreciated that the mobile computing device 400 may use any suitable processor architecture and/or any suitable number of processors or number of processor cores in accordance with the described embodiments. In one embodiment, for example, the processors 402, 404 may be implemented using a single integrated processor.

The host processor 402 may be implemented as a host central processing unit (CPU) using any suitable processor or logic device, such as a as a general purpose processor. The host processor 402 may also be implemented as a chip multiprocessor (CMP), dedicated processor, embedded processor, media processor, input/output (I/O) processor, co-processor, microprocessor, controller, microcontroller, application specific integrated circuit (ASIC), field programmable gate array (FPGA), programmable logic device (PLD), or other processing device in accordance with the described embodiments.

As shown, the host processor 402 may be coupled through a memory bus 408 to a memory 410. The memory bus 408 may comprise any suitable interface and/or bus architecture for allowing the host processor 402 to access the memory 410. Although the memory 410 may be shown as being separate from the host processor 402 for purposes of illustration, it is worthy to note that in various embodiments some portion or the entire memory 410 may be included on the same integrated circuit as the host processor 402. Alternatively, some portion or the entire memory 410 may be disposed on an integrated circuit or other medium (e.g., hard disk drive) external to the integrated circuit of the host processor 402. In various embodiments, the mobile computing device 400 may comprise an expansion slot to support a multimedia and/or memory card, for example.

The memory 410 may be implemented using any computer-readable media capable of storing data such as volatile or non-volatile memory, removable or non-removable memory, erasable or non-erasable memory, writeable or re-writeable memory, and so forth. Examples of computer-readable storage media may include, without limitation, random-access memory (RAM), dynamic RAM (DRAM), Double-Data-Rate DRAM (DDRAM), synchronous DRAM (SDRAM), static RAM (SRAM), read-only memory (ROM), programmable ROM (PROM), erasable programmable ROM (EPROM), electrically erasable programmable ROM (EEPROM), flash memory (e.g., NOR or NAND flash memory), content addressable memory (CAM), polymer memory (e.g., ferroelectric polymer memory), phase-change memory, ovonic memory, ferroelectric memory, silicon-oxide-nitride-oxide-silicon (SONOS) memory, magnetic or optical cards, or any other type of media suitable for storing information.

The mobile computing device 400 may comprise an alphanumeric keypad 412 coupled to the host processor 402. The keypad 412 may comprise, for example, a QWERTY key layout and an integrated number dial pad. The mobile computing device 400 also may comprise various keys, buttons, and switches such as, for example, input keys, preset and programmable hot keys, left and right action buttons, a navigation button such as a multidirectional navigation button, phone/send and power/end buttons, preset and programmable shortcut buttons, a volume rocker switch, a ringer on/off switch having a vibrate mode, and so forth. The keypad 412 may comprise a physical keypad using hard buttons, or a virtual keypad using soft buttons displayed on a display 414. The keypad may also comprise a thumbboard.

The mobile computing device 400 may comprise a display 414 coupled to the host processor 402. The display 414 may comprise any suitable visual interface for displaying content to a user of the mobile computing device 400. In one embodiment, for example, the display 414 may be implemented by a liquid crystal display (LCD) such as a touch-sensitive color (e.g., 46-bit color) thin-film transistor (TFT) LCD screen. The touch-sensitive LCD may be used with a stylus and/or a handwriting recognizer program.

The mobile computing device 400 may comprise a vibrate motor 416 coupled to the host processor 402. The vibrate motor 416 may be enable or disabled according to the preferences of the user of the mobile computing device 400. When enabled, the vibrate motor 416 may cause the mobile computing device 400 to move or shake in a generic and/or patterned fashion in response to a triggering event such as the receipt of a telephone call, text message, an alarm condition, a game condition, and so forth. Vibration may occur for a fixed duration and/or periodically according to a pulse.

The mobile computing device 400 may comprise an input/output (I/O) interface 418 coupled to the host processor 402. The I/O interface 418 may comprise one or more I/O devices such as a serial connection port, an infrared port, integrated Bluetooth wireless capability, global position system (GPS) capability, and/or integrated 802.11x (e.g. 802.11b, 802.11g, 802.11a, 802.11n, etc.) (WiFi) wireless capability, to enable wired (e.g., USB cable) and/or wireless connection to a local computer system, such as a local personal computer (PC). In various implementations, mobile computing device 400 may be arranged to synchronize information with a local computer system.

The host processor 402 may be coupled to various audio/video (A/V) devices 420 that support A/V capability of the mobile computing device 400. Examples of A/V devices 420 may include, for example, a microphone, one or more speakers (such as speaker system 108), an audio port to connect an audio headset, an audio coder/decoder (codec), an audio player, a Musical Instrument Digital Interface (MIDI) device, a digital camera, a video camera, a video codec, a video player, and so forth.

The host processor 402 may be coupled to a power supply 422 arranged to supply and manage power to the elements of the mobile computing device 400. In various embodiments, the power supply 422 may be implemented by a rechargeable battery, such as a removable and rechargeable lithium ion battery to provide direct current (DC) power, and/or an alternating current (AC) adapter to draw power from a standard AC main power supply.

The radio processor 404 may be arranged to communicate voice information and/or data information over one or more assigned frequency bands of a wireless communication channel. The radio processor 404 may be implemented as a communications processor using any suitable processor or logic device, such as a modem processor or baseband processor. The radio processor 404 may also be implemented as a digital signal processor (DSP), media access control (MAC) processor, or any other type of communications processor in accordance with the described embodiments. The radio processor 404 may perform analog and/or digital baseband operations for the mobile computing device 400. For example, the radio processor 404 may perform digital-to-analog conversion (DAC), analog-to-digital conversion (ADC), modulation, demodulation, encoding, decoding, encryption, decryption, and so forth.

The mobile computing device 400 may comprise a memory 424 coupled to the radio processor 404. The memory 424 may be implemented using any of the computer-readable media described with reference to the memory 410. The memory 424 may be typically implemented as flash memory and synchronous dynamic random access memory (SDRAM). Although the memory 424 may be shown as being separate from the radio processor 404, some or all of the memory 424 may be included on the same IC as the radio processor 404.

The mobile computing device 400 may comprise a transceiver module 426 coupled to the radio processor 404. The transceiver module 426 may comprise one or more transceivers, such as wireless transceivers 108 of mobile computing device 100, arranged to communicate using different types of protocols, communication ranges, operating power requirements, RF sub-bands, information types (e.g., voice or data), use scenarios, applications, and so forth. In various embodiments, the transceiver module 426 may comprise one or more transceivers arranged to support voice communications and/or data communications for the wireless network systems or protocols as previously described. In some embodiments, the transceiver module 426 may further comprise a Global Positioning System (GPS) transceiver to support position determination and/or location-based services.

The transceiver module 426 generally may be implemented using one or more chips as desired for a given implementation. Although the transceiver module 426 may be shown as being separate from and external to the radio processor 404 for purposes of illustration, it is worthy to note that in various embodiments some portion or the entire transceiver module 426 may be included on the same integrated circuit as the radio processor 404. The embodiments are not limited in this context.

The mobile computing device 400 may comprise an antenna system 428 for transmitting and/or receiving electrical signals. As shown, the antenna system 428 may be coupled to the radio processor 404 through the transceiver module 426. The antenna system 428 may comprise or be implemented as one or more internal antennas and/or external antennas, such as antenna 112 of mobile computing device 100.

The mobile computing device 400 may comprise a subscriber identity module (SIM) 430 coupled to the radio processor 404. The SIM 430 may comprise, for example, a removable or non-removable smart card arranged to encrypt voice and data transmissions and to store user-specific data for allowing a voice or data communications network to identify and authenticate the user. The SIM 430 also may store data such as personal settings specific to the user. In some embodiments, the SIM 430 may be implemented as an UMTS universal SIM (USIM) card or a CDMA removable user identity module (RUIM) card. The SIM 430 may comprise a SIM application toolkit (STK) 432 comprising a set of programmed commands for enabling the SIM 430 to perform various functions. In some cases, the STK 432 may be arranged to enable the SIM 430 to independently control various aspects of the mobile computing device 400.

As mentioned above, the host processor 402 may be arranged to provide processing or computing resources to the mobile computing device 400. For example, the host processor 402 may be responsible for executing various software programs including system programs such as operating system (OS) 434 and application programs 436. System programs generally may assist in the running of the mobile computing device 400 and may be directly responsible for controlling, integrating, and managing the individual hardware components of the computer system. The OS 434 may be implemented, for example, as a Palm webOS™, Palm OS®, Palm OS® Cobalt, Microsoft® Windows OS, Microsoft Windows® CE OS, Microsoft Pocket PC OS, Microsoft Mobile OS, Symbian OS™, Embedix OS, Linux OS, Binary Run-time Environment for Wireless (BREW) OS, JavaOS, a Wireless Application Protocol (WAP) OS, or other suitable OS in accordance with the described embodiments. The mobile computing device 400 may comprise other system programs such as device drivers, programming tools, utility programs, software libraries, application programming interfaces (APIs), and so forth.

Application programs 436 generally may allow a user to accomplish one or more specific tasks. In various implementations, the application programs 436 may provide one or more graphical user interfaces (GUIs) to communicate information between the mobile computing device 400 and a user. In some embodiments, application programs 436 may comprise upper layer programs running on top of the OS 434 of the host processor 402 that operate in conjunction with the functions and protocols of lower layers including, for example, a transport layer such as a Transmission Control Protocol (TCP) layer, a network layer such as an Internet Protocol (IP) layer, and a link layer such as a Point-to-Point (PPP) layer used to translate and format data for communication.

Examples of application programs 436 may include, without limitation, messaging applications, web browsing applications, personal information management (PIM) applications (e.g., contacts, calendar, scheduling, tasks), word processing applications, spreadsheet applications, database applications, media applications (e.g., video player, audio player, multimedia player, digital camera, video camera, media management), gaming applications, and so forth. Messaging applications may be arranged to communicate various types of messages in a variety of formats. Examples of messaging applications may include without limitation a cellular telephone application, a Voice over Internet Protocol (VoIP) application, a Push-to-Talk (PTT) application, a voicemail application, a facsimile application, a video teleconferencing application, an IM application, an e-mail application, an SMS application, an MMS application, and so forth. It is also to be appreciated that the mobile computing device 400 may implement other types of applications in accordance with the described embodiments.

The mobile computing device 400 may include various databases implemented in the memory 410. For example, the mobile computing device 400 may include a message content database 438, a message log database 440, a contacts database 442, a media database 444, a preferences database 446, and so forth. The message content database 438 may be arranged to store content and attachments (e.g., media objects) for various types of messages sent and received by one or more messaging applications. The message log 440 may be arranged to track various types of messages which are sent and received by one or more messaging applications. The contacts database 442 may be arranged to store contact records for individuals or entities specified by the user of the mobile computing device 400. The media database 444 may be arranged to store various types of media content such as image information, audio information, video information, and/or other data. The preferences database 446 may be arranged to store various settings such as rules and parameters for controlling the operation of the mobile computing device 400.

The host processor 402 may include a feature control module 450. The feature control module 450 may be operative to enable a first set of features for the mobile computing device 400 when in the first configuration, and a second set of features for the mobile computing device 400 when in the second configuration. The features may include any combination of hardware features, software features, or a combination of both. For example, the first set of features may be a first set of application programs 436*a* and a second set of application programs 436*b*. Since the first configuration is a closed configuration hiding the thumbboard 110, the first set of application programs 436*a* may include those application programs capable of receiving voice commands. Since the second configuration is an open configuration exposing the thumbboard 110, the second set of application programs 436*b* may include those application programs capable of receiving text commands. In another example, the first and second set of features may comprise certain hardware components. Since the first configuration is a closed configuration hiding the thumbboard 110, the first set of hardware components may include a cellular transceiver for voice communications, a Bluetooth transceiver for hands-free operations, various audio devices, and other hardware components not requiring extensive text commands. Since the second configuration is an open configuration exposing the thumbboard 110, the second set of hardware components may include a WiFi transceiver for data communications (e.g., web browsing, texting, email) and other hardware components requiring text commands. In yet another example, the first set of features may include low power applications while the second set of features may include higher power applications, in order to implement various power management techniques. It may be appreciated that any combination of feature sets may be selected for the first and second configurations based on any number of criteria or design parameters as desired for a given implementation, and the embodiments are not limited in this context.

Operations for the above embodiments may be further described with reference to the following figures and accompanying examples. Some of the figures may include a logic diagram. Although such figures presented herein may include a particular logic diagram, it can be appreciated that the logic diagram merely provides an example of how the general functionality as described herein can be implemented. Further, the given logic diagram does not necessarily have to be executed in the order presented, unless otherwise indicated. In addition, the given logic diagram may be implemented by a hardware element, a software element executed by a processor, or any combination thereof. The embodiments are not limited in this context.

FIG. 5 illustrates a logic diagram. In particular, FIG. 5 illustrates a logic diagram 500, which may be representative of the operations executed by one or more embodiments described herein.

The logic diagram 500 may measure a magnetic field strength produced by a speaker magnet at a block 502. For example, the magnetic sensor 308 may measure a magnetic field strength produced by a speaker magnet 306. The magnetic sensor 308 may be arranged to take measurements on a continuous basis, periodic basis, aperiodic basis, on demand, and other criteria as desired for a given implementation.

The logic diagram 500 may generate a first position signal when the measured magnetic field strength is higher, the first position signal representing a first configuration for a mobile computing device, at block 504. For example, the magnetic sensor 308 may generate a higher voltage signal when the measured magnetic field strength meets or is higher than a defined value, where the higher voltage signal represents a closed configuration for the mobile computing devices 100, 400.

The logic diagram 500 may generate a second position signal when the measured magnetic field strength is lower, the second position signal representing a second configuration for the mobile computing device, at block 506. For example, the magnetic sensor 308 may generate a lower voltage signal when the measured magnetic field strength meets or is lower than a defined value, where the lower voltage signal represents an open configuration for the mobile computing devices 100, 400.

In some cases, various embodiments may be implemented as an article of manufacture. The article of manufacture may include a computer readable storage medium arranged to store logic, instructions and/or data for performing various operations of one or more embodiments. Examples of storage media may include, without limitation, those examples as previously described. In various embodiments, for example, the article of manufacture may comprise a magnetic disk, optical disk, flash memory or firmware containing computer program instructions suitable for execution by a general purpose processor or application specific processor. The embodiments, however, are not limited in this context.

Various embodiments may be implemented using hardware elements, software elements, or a combination of both. Examples of hardware elements may include any of the examples as previously provided for a logic device, and further including microprocessors, circuits, circuit elements (e.g., transistors, resistors, capacitors, inductors, and so forth), integrated circuits, logic gates, registers, semiconductor device, chips, microchips, chip sets, and so forth. Examples of software elements may include software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints, as desired for a given implementation.

Some embodiments may be described using the expression "coupled" and "connected" along with their derivatives. These terms are not necessarily intended as synonyms for each other. For example, some embodiments may be described using the terms "connected" and/or "coupled" to indicate that two or more elements are in direct physical or electrical contact with each other. The term "coupled," however, may also mean that two or more elements are not in direct contact with each other, but yet still co-operate or interact with each other.

It is emphasized that the Abstract of the Disclosure is provided to comply with 37 C.F.R. Section 1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment. In the appended claims, the terms "including" and "in which" are used as the plain-English equivalents of the respective terms "comprising" and "wherein," respectively. Moreover, the terms "first," "second," "third," and so forth, are used merely as labels, and are not intended to impose numerical requirements on their objects.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

The invention claimed is:

1. A mobile computing device, comprising:
   a housing having a first housing portion, a second housing portion and a configuration portion, the configuration portion to allow the first housing portion and the second housing portion to move relative to each other to form a first configuration or a second configuration;
   a magnetic sensor disposed in the first housing portion, the magnetic sensor to measure a magnetic field strength for a magnet, and output a position signal indicative of the first configuration or the second configuration based on the measured magnetic field strength, the position signal indicating the first configuration before the first configuration is formed and indicating the second configuration before the second configuration is formed;
   a feature control module to enable a first set of applications for receiving voice commands based on the position signal indicative of the first configuration, and a second set of applications for receiving text commands based on the position signal indicative of the second configuration; and
   a speaker with the magnet disposed in the second housing portion.

2. The mobile computing device of claim 1, the first configuration comprising a closed configuration, and the second configuration comprising an open configuration.

3. The mobile computing device of claim 1, the first configuration comprising a closed configuration wherein a top edge and a bottom edge of the first housing portion substantially matches a top edge and a bottom edge of the second housing portion.

4. The wireless device of claim 1, the second configuration comprising an open configuration wherein a top edge and a bottom edge of the first housing portion are offset from a top edge and a bottom edge of the second housing portion.

5. The mobile computing device of claim 1, the configuration portion comprising a sliding structure, a pivot structure or a folding structure.

6. The mobile computing device of claim 1, the magnetic sensor comprising a Hall effect magnetic sensor.

7. The mobile computing device of claim 1, the measured magnetic field strength representing a distance between the magnet and the magnetic sensor.

8. The mobile computing device of claim 1, the magnetic sensor disposed on the configuration portion.

9. The mobile computing device of claim 1, the magnetic sensor disposed on an inner surface of the first housing portion.

10. The mobile computing device of claim 1, the configuration portion having an aperture for the sensor.

11. The mobile computing device of claim 1, the second housing portion having input keys that are hidden when in the first configuration and exposed when in the second configuration.

12. The mobile computing device of claim 1, the first housing portion having a display, and the second housing portion having a thumbboard.

13. A mobile computing device, comprising:
  a housing having a sliding structure arranged to allow a first housing portion and a second housing portion to move relative to each other to form a first configuration or a second configuration;
  a magnetic sensor disposed in the first housing portion, the magnetic sensor to measure a magnetic field strength for a magnet, and output a position signal indicative of the first configuration or the second configuration based on the measured magnetic field strength, the position signal indicating the first configuration before the first configuration is formed and indicating the second configuration before the second configuration is formed;
  a feature control module to enable a first set of applications for receiving voice commands based on the position signal indicative of the first configuration, and a second set of applications for receiving text commands based on the position signal indicative of the second configuration; and
  a speaker with the magnet disposed in the second housing portion.

14. The mobile computing device of claim 13, the magnetic sensor comprising a Hall effect magnetic sensor.

15. The mobile computing device of claim 13, the second housing portion having input keys that are hidden when in the first configuration and exposed when in the second configuration.

16. A method, comprising:
  measuring a magnetic field strength produced by a speaker magnet;
  generating a first position signal when the measured magnetic field strength is higher and before a first configuration is reached, the first position signal representing the first configuration for a mobile computing device;
  generating a second position signal when the measured magnetic field strength is lower and before a second configuration is reached, the second position signal representing the second configuration for the mobile computing device;
  enabling a first set of applications for receiving voice commands based on the first position signal representing the first configuration; and
  enabling a second set of applications for receiving text commands based on the second position signal representing the second configuration.

17. The method of claim 16, the measuring occurring on a periodic basis.

18. The method of claim 16, determining a distance between the magnet and a magnetic sensor.

* * * * *